(12) United States Patent
Liu

(10) Patent No.: US 10,180,730 B1
(45) Date of Patent: Jan. 15, 2019

(54) KEYBOARD HAVING FINGERPRINT IDENTIFICATION MODULES

(71) Applicant: Yung-Lung Liu, Taichung (TW)

(72) Inventor: Yung-Lung Liu, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 15/679,543

(22) Filed: Aug. 17, 2017

(51) Int. Cl.
*G06F 3/02* (2006.01)
*H01H 13/705* (2006.01)
*G06K 9/00* (2006.01)

(52) U.S. Cl.
CPC ....... *G06F 3/0202* (2013.01); *G06K 9/00006* (2013.01); *H01H 13/705* (2013.01)

(58) Field of Classification Search
CPC .............. H04N 21/4415; G06F 21/32; H04L 29/06809; H04L 9/3231; H04L 63/0861; H04W 12/06; G06K 9/00; G06K 9/00006–9/00852; G06K 9/20; A61B 5/1117; H01L 51/445
See application file for complete search history.

(56) References Cited

U.S. PATENT DOCUMENTS

| | | | |
|---|---|---|---|
| 2008/0247613 A1* | 10/2008 | Chang | G06K 9/00046 382/124 |
| 2014/0014488 A1* | 1/2014 | Tsai | H01H 13/88 200/5 A |
| 2014/0285955 A1* | 9/2014 | Matsumoto | G06F 1/1626 361/679.01 |
| 2017/0091436 A1* | 3/2017 | Cao | G06F 1/1616 |
| 2018/0067642 A1* | 3/2018 | Stemple | G06F 3/04883 |

FOREIGN PATENT DOCUMENTS

JP    2006-155455 A  *  6/2006  .............. G06T 1/00

* cited by examiner

*Primary Examiner* — Sanghyuk Park

(57) ABSTRACT

A keyboard includes key caps, bridge structures, a circuit board, resilient members, fingerprint identification modules, a microprocessor, and an aluminum board. Each key cap is disposed on top of the bridge structure. Each bridge structure is pivotably disposed on top of the aluminum board. The circuit board is disposed between the bridge structures and the aluminum board. Each resilient member is disposed between the key cap and the circuit board. Each fingerprint identification module is disposed on the key cap and electrically connected to the circuit board. The microprocessor is disposed on the circuit board and electrically connected to the fingerprint identification modules. The aluminum board is configured to support the circuit board from below and includes a plurality of pivotal seats on a top, each pivotal seat passing through the circuit board to fasten the bridge structure, the circuit board, and the aluminum board together.

3 Claims, 4 Drawing Sheets

US 10,180,730 B1

KEYBOARD HAVING FINGERPRINT IDENTIFICATION MODULES

BACKGROUND OF THE INVENTION

1. Field of the Invention

The invention relates to keyboards and more particularly to a keyboard having at least one fingerprint identification module each provided on top of a key cap.

2. Description of Related Art

Mobile devices such as tablet computers and smartphones are widely used. Further, personal data and privacy protection is gaining attention. Typically, a password is used to identify an authorized individual after powering on a computer. The individual can use the computer if he or she passes the password test. Typically, a complicated combination of password has better protection. But entering the complicated password is time consuming and typographical errors are often. However, a simple password can be easily cracked and is not encouraged by many designers. Also, fingerprint is used as one of biometric identifiers. For example, fingerprint is widely used as means for authenticate a user in an electronic device. However, a single fingerprint identification device is used for authentication in any of mobile phones, tablet computers, laptop computers and keyboards. Its drawbacks include less change and low security. Thus, the need for improvement still exists.

SUMMARY OF THE INVENTION

It is therefore one object of the invention to provide a keyboard comprising a plurality of key caps, a plurality of bridge structures, a circuit board, a plurality of resilient members, a plurality of fingerprint identification modules, a microprocessor, and an aluminum board wherein each key cap is disposed on top of the bridge structure; each bridge structure is pivotably disposed on top of the aluminum board; the circuit board is disposed between the bridge structures and the aluminum board; each resilient member is disposed between the key cap and the circuit board; each fingerprint identification module is disposed on the key cap and electrically connected to the circuit board; the microprocessor is disposed on the circuit board and electrically connected to the fingerprint identification modules; and the aluminum board is configured to support the circuit board from below and includes a plurality of pivotal seats on a top, each pivotal seat passing through the circuit board to fasten the bridge structure, the circuit board, and the aluminum board together.

The above and other objects, features and advantages of the invention will become apparent from the following detailed description taken with the accompanying drawings.

DETAILED DESCRIPTION OF THE INVENTION

Figure 1:
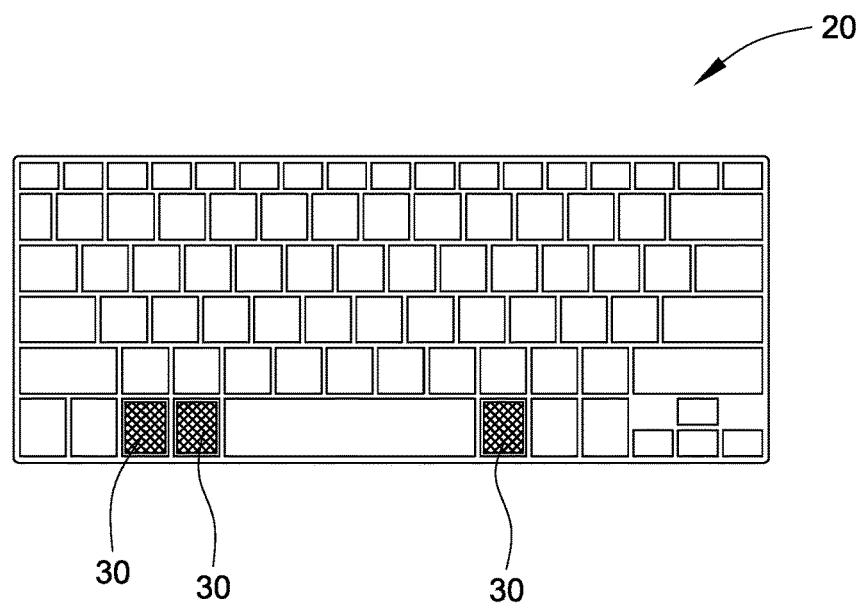
FIG. 1 is a top view of a keyboard according to a first preferred embodiment of the invention.
Figure 2:
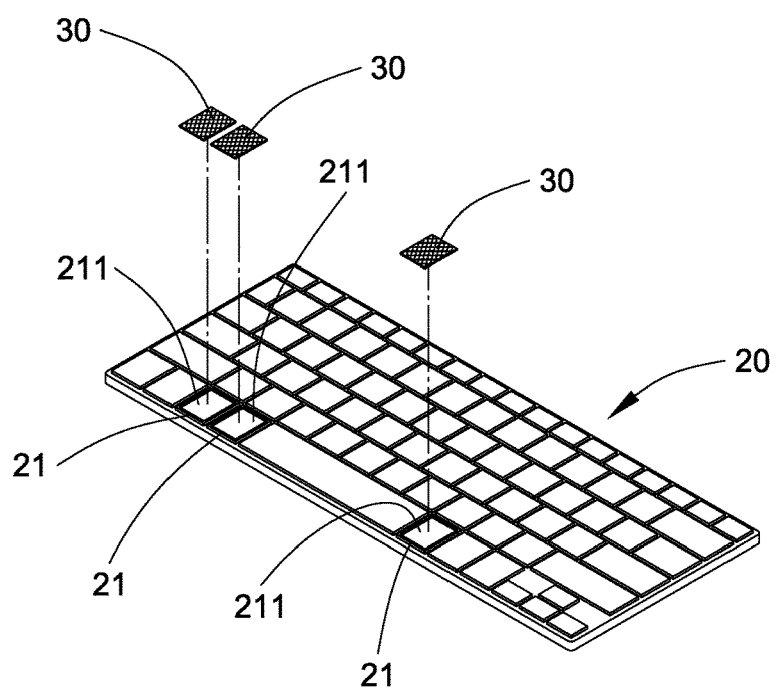
FIG. 2 is an exploded, perspective view of the keyboard.
Figure 2A:
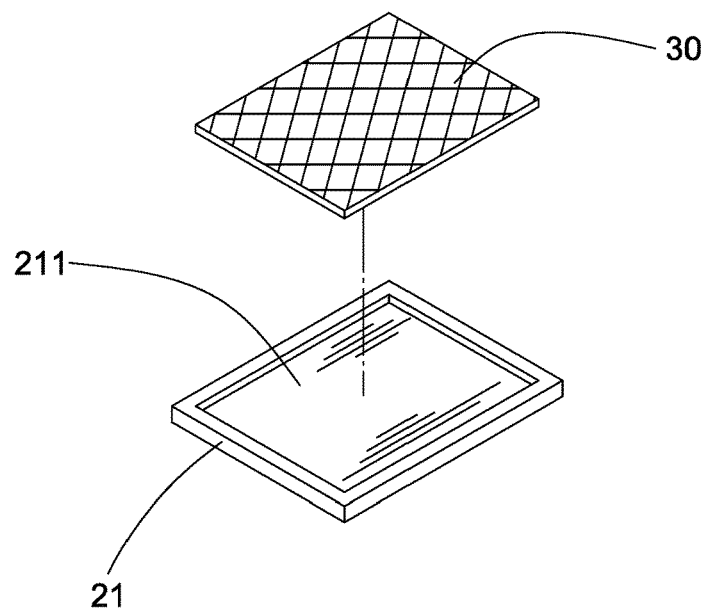
FIG. 2A is an exploded view of the fingerprint identification module and the key cap.

Referring to FIGS. 1 to 5, a keyboard 20 in accordance with a first preferred embodiment of the invention comprises a plurality of key caps 21, a plurality of bridge structures 22, a circuit board 23, a plurality of fingerprint identification modules 30, a microprocessor 40 and an aluminum board 24 as discussed in detail below.

The key cap 21 includes a rectangular recess 211 on a top. The bridge structure 22 is pivotably disposed on top of the aluminum board 24. The circuit board 23 is disposed between the bridge structure 22 and the aluminum board 24. The circuit board 23 includes a first conductive layer, a second conductive layer and a plurality of contacts. A plurality of resilient members 231 are provided on the contacts. Each resilient member 231 urges against an underside of the key cap 21.

Figure 3:
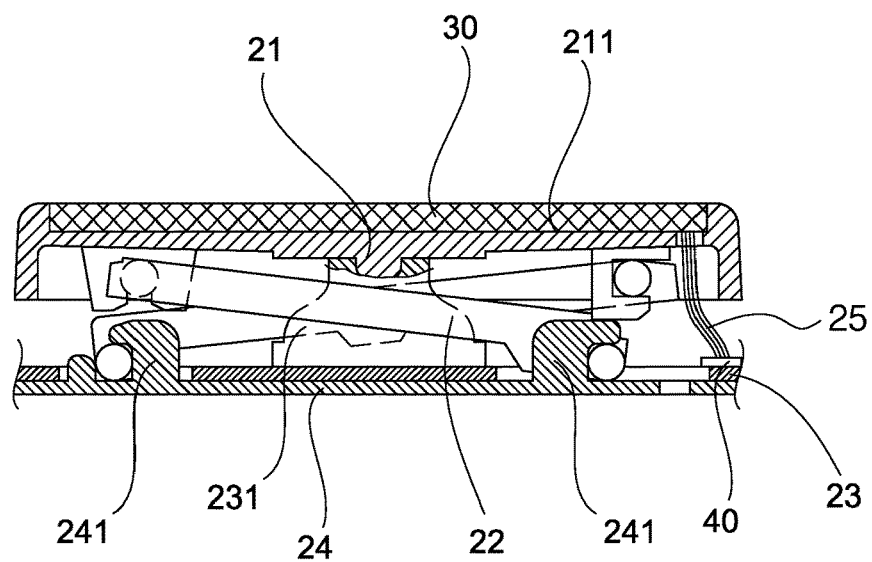
FIG. 3 is an exploded, perspective view of the key cap.
Figure 4:
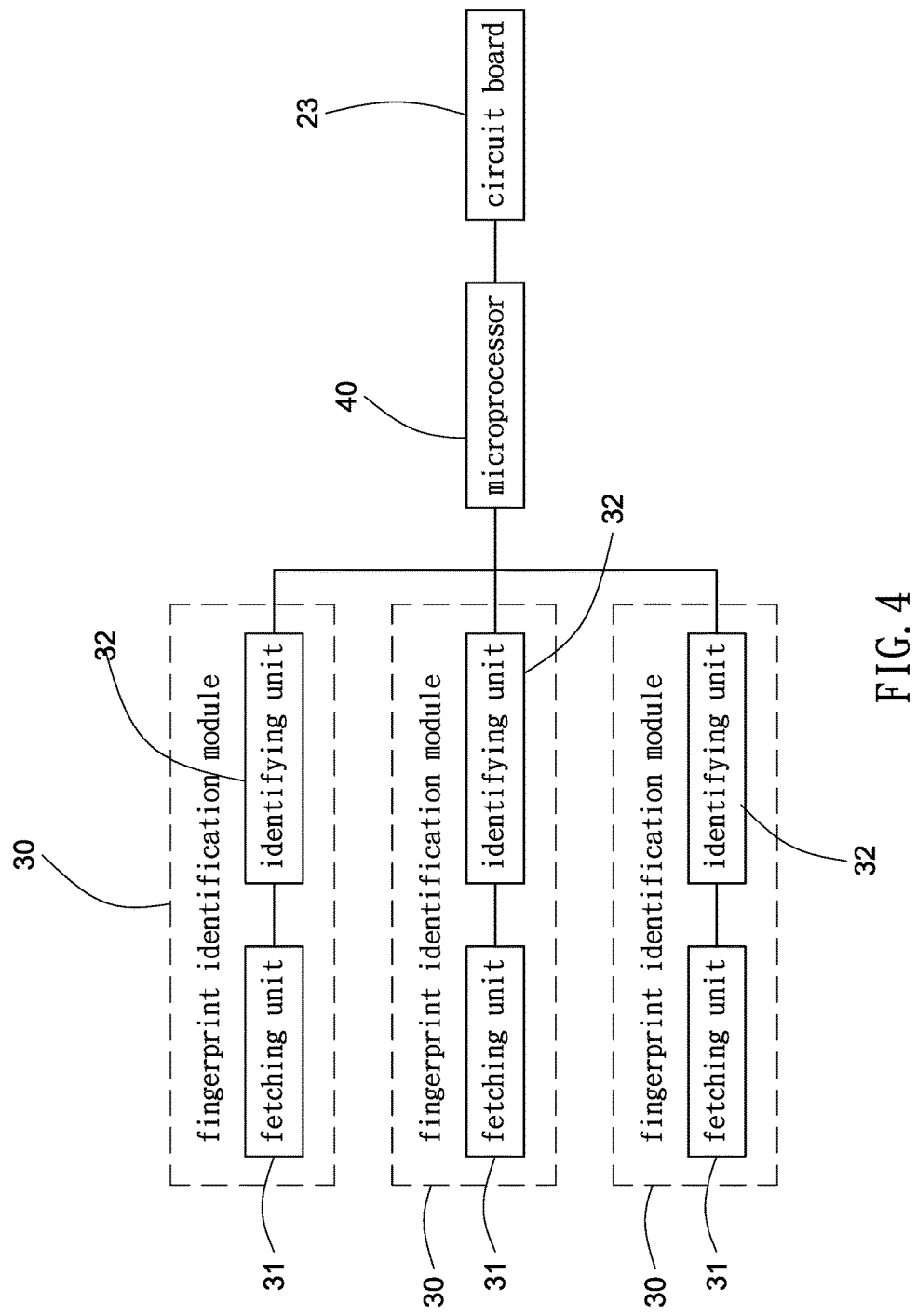
FIG. 4 is a longitudinal sectional view of the key cap and components therebelow.

The fingerprint identification module 30 is disposed in the recess 211 and electrically connected to the circuit board 23 (as shown in FIG. 3, the fingerprint identification module 30 being electrically connected to the circuit board 23 by a wire 25). The fingerprint identification module 30 includes a fetching unit 31 for receiving data of a fingerprint of a user's finger touching the key cap 21, and an identifying unit 32 for converting the fingerprint data into a fingerprint signal. The fetching unit 31 and the identifying unit 32 are integrated into the fingerprint identification module 30 as shown in FIG. 4. In the embodiment, a plurality of the fingerprint identification modules 30 are provided on tops of the key caps 21. In other embodiments, the number of the fingerprint identification modules 30 can be increased or decreased depending on applications.

The microprocessor 40 is provided on the circuit board 23 and electrically connected to the fingerprint identification modules 30. The microprocessor 40 can receive, store and determine the fingerprint signal transmitted from the identifying unit 32 (see FIG. 4). Thus, the microprocessor 40 can authenticate the user prior to activating the keyboard 20. The aluminum board 24 is adapted to support the circuit board 23 from below. A plurality of pivotal seats 241 are provided on top of the aluminum board 24. Each pivotal seat 241 passes through a hole of the circuit board 23 to assemble the bridge structure 22, the circuit board 23 and the aluminum board 24.

The fingerprint identification modules 30 are incorporated into power on self test (POST) of a personal computer (PC) so that the PC can be operated only after the authentication is done by the fingerprint identification modules 30. This prevents the PC from being used by an unauthorized third party.

Figure 5:
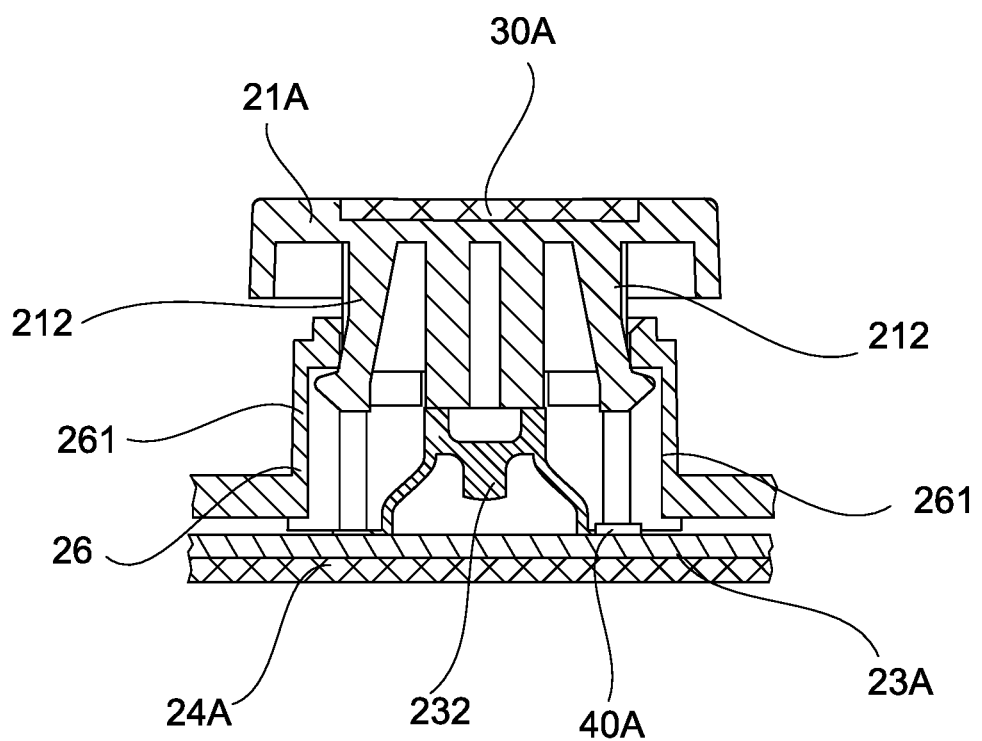
FIG. 5 is a view similar to FIG. 4 showing a key cap and components therebelow according to a second preferred embodiment of the invention.

Referring to FIG. 5, a keyboard in accordance with a second preferred embodiment of the invention is shown and comprises a plurality of key caps 21A, a plurality of key supports 26, a circuit board 23A, a plurality of fingerprint identification modules 30A, a microprocessor 40A and an aluminum board 24A as discussed in detail below.

The key cap 21A is a square and includes a plurality of legs 212 arranged as a rectangle extending downward, and a rectangular recess 211 on a top. The key support 26 includes a hollow frame 261 of rectangular section attached to the legs 212. The circuit board 23A is disposed between the key support 26 and the aluminum board 24A. A plurality of resilient elements 232 each are disposed between the circuit board 23A and the key cap 21A. The resilient element 232 urges against an underside of the key cap 21A.

The fingerprint identification module 30A is disposed in the recess 211 and electrically connected to the circuit board 23A. The microprocessor 40A is provided on the circuit board 23A and electrically connected to the fingerprint identification modules 30A. The aluminum board 24A is adapted to support the circuit board 23A from below. A plurality of pivotal seats are provided on top of the aluminum board 24A. Each pivotal seat passes through a hole of the circuit board 23A to assemble the key support 26, the circuit board 23A and the aluminum board 24A.

The characteristics of the second preferred embodiment are substantially the same as that of the first preferred embodiment except the following: The key cap 21A is a square. The legs 212 extend downward from an underside of the key cap 21A. The key support 26 is attached to the key cap 21A. Specifically, the key support 26 includes a hollow frame 261 of rectangular section attached to the legs 212. Thus, the key cap 21A can be pressed down and moves up relative to the key support 26 in operation.

It is envisaged by the invention that the number of the fingerprint identification modules 30 can be changed depending on applications. For example, a plurality of users can have the fingerprints being authenticated by the fingerprint identification modules 30 or a single user can have the multiple fingerprints being authenticated by the fingerprint identification modules 30. For instance, there are provided three fingerprint identification modules 30 so that three users can be authenticated by pressing their fingers on the fingerprint identification modules 30 respectively. In another example, a single user can have his or her three fingers authenticated by the three fingerprint identification modules 30 respectively. In addition to the above, the microprocessor 40 can be designed to perform many different authentications depending on applications. The provision of the fingerprint identification module 30 in the recess 211 can save space because there is no provision of additional space for accommodating the fingerprint identification modules 30. Thus, the keyboard 20 can be made compact.

While the invention has been described in terms of preferred embodiments, those skilled in the art will recognize that the invention can be practiced with modifications within the spirit and scope of the appended claims.

What is claimed is:

1. A keyboard comprising a plurality of key caps, a plurality of bridge structures, a circuit board, a plurality of resilient members, a plurality of fingerprint identification modules, a microprocessor, and an aluminum board wherein:
   each key cap is disposed on top of the bridge structure;
   each bridge structure is pivotably disposed on top of the aluminum board;
   the circuit board is disposed between the bridge structures and the aluminum board;
   each resilient member is disposed between the key cap and the circuit board;
   each fingerprint identification module is disposed on the key cap and electrically connected to the circuit board;
   the microprocessor is disposed on the circuit board and electrically connected to the fingerprint identification modules; and
   the aluminum board is configured to support the circuit board from below and includes a plurality of pivotal seats on a top, each pivotal seat passing through the circuit board to fasten the bridge structure, the circuit board, and the aluminum board together.

2. The keyboard of claim 1, wherein each key cap includes a recess on a top for receiving each fingerprint identification module.

3. A keyboard comprising a plurality of key caps, a plurality of key supports, a circuit board, a plurality of resilient elements, a plurality of fingerprint identification modules, a microprocessor, and an aluminum board wherein:
   each key cap is a square and includes a hollow leg structure of rectangular section extending downward, and a rectangular recess on a top;
   each key support includes a hollow frame of rectangular section attached to the leg structure;
   the circuit board is disposed between the key supports and the aluminum board;
   each resilient element is disposed between the key cap and the circuit board;
   each fingerprint identification module is disposed on the key cap and electrically connected to the circuit board;
   the microprocessor is disposed on the circuit board and electrically connected to the fingerprint identification modules; and
   the aluminum board is configured to support the circuit board from below and includes a plurality of pivotal seats on a top, each pivotal seat passing through the circuit board to fasten the key support, the circuit board, and the aluminum board together.

* * * * *